(12) United States Patent
Yamane

(10) Patent No.: US 8,123,248 B2
(45) Date of Patent: Feb. 28, 2012

(54) SIDE AIRBAG APPARATUS

(75) Inventor: Kazuya Yamane, Tokyo (JP)

(73) Assignee: Fuji Jukogyo Kabushiki Kaisha, Shinjuku-ku, Tokyo (JP)

( * ) Notice: Subject to any disclaimer, the term of this patent is extended or adjusted under 35 U.S.C. 154(b) by 0 days.

(21) Appl. No.: 12/805,755

(22) Filed: Aug. 18, 2010

(65) Prior Publication Data

US 2011/0062692 A1    Mar. 17, 2011

(30) Foreign Application Priority Data

Sep. 11, 2009   (JP) .................................. 2009-210817

(51) Int. Cl.
*B60R 21/30* (2006.01)

(52) U.S. Cl. .................... 280/739; 280/743.1; 280/743.2

(58) Field of Classification Search .................. 280/739, 280/743.1, 743.2
See application file for complete search history.

(56) References Cited

U.S. PATENT DOCUMENTS

| | | | | |
|---|---|---|---|---|
| 6,378,896 B1* | 4/2002 | Sakakida et al. | ............ | 280/730.2 |
| 6,676,158 B2* | 1/2004 | Ishikawa | .................... | 280/743.1 |
| 6,832,778 B2* | 12/2004 | Pinsenschaum et al. | ...... | 280/739 |
| 7,168,736 B2* | 1/2007 | Tanase et al. | ............... | 280/730.2 |
| 7,192,050 B2* | 3/2007 | Sato et al. | ...................... | 280/729 |
| 7,264,268 B2* | 9/2007 | Ehrke | ........................... | 280/729 |
| 7,651,130 B2* | 1/2010 | Bauberger | ................. | 280/743.2 |
| 7,686,327 B2* | 3/2010 | Heuschmid et al. | .......... | 280/729 |
| 2002/0047253 A1* | 4/2002 | Rasch et al. | ................ | 280/728.2 |

FOREIGN PATENT DOCUMENTS

JP            6-262993 A       9/1994

* cited by examiner

*Primary Examiner* — Toan To
(74) *Attorney, Agent, or Firm* — McGinn IP Law Group, PLLC

(57) ABSTRACT

A plurality of vent holes are formed on an airbag body and each vent hole is blocked by an elongate blocking member. An end of the blocking member is fixed to the airbag body and other portions are temporarily fixed to an opposite inner surface of the airbag body. When the airbag body is inflated, at a portion abutting a shoulder of an occupant, the connecting member is loose, the blocking member blocks the vent hole, and thereby gas is not discharged. At portions other than the portion abutting the shoulder of the occupant, a temporary joint portion of the blocking member is pulled and peeled off, the vent holes are opened, and thereby the gas is discharged forward.

16 Claims, 4 Drawing Sheets

SIDE AIRBAG APPARATUS

CROSS REFERENCES TO RELATED APPLICATIONS

The present application claims priority from Japanese Patent Application No. 2009-210817 filed on Sep. 11, 2009, and is hereby incorporated by reference in its entirety.

BACKGROUND OF THE INVENTION

1. Field of the Invention

The present invention particularly relates to a side airbag apparatus that is equipped to a vehicle such as an automobile and is deployed between a side door and an occupant for protecting the occupant.

2. Description of the Related Art

A side bag equipped to a vehicle, which is inflated by gas generated by burning gas propellant in an inflator and inflated to push an occupant, is typically provided with a vent hole for releasing the gas in order to avoid pushing too hard and thereby hurting the occupant. It is necessary to set the vent hole in such a position that the high-temperature gas generated in the inflator does not move toward the occupant. In conventional airbag apparatuses, as shown in FIG. 6, a vent hole 101 is usually disposed at a position in an airbag body 100, which is on the opposite side of an occupant H and on the lateral side to a vehicle body.

However, when the airbag body 100 is inflated, the lateral side to the vehicle body thereof adheres tightly to an inner wall portion of the vehicle compartment such as a door trim 102. Therefore, the vent hole is easily blocked and accordingly the gas may not be discharged smoothly from the vent hole 101.

In order to address this problem, Japanese Unexamined Patent Application Publication No. 1994-262993 proposes a technology wherein a escaping portion for the gas discharged from the vent hole is provided at a position on the inner wall of the vehicle which corresponds to the vent hole when the airbag is inflated.

When a conventional side airbag apparatus with a vent hole 101 on the lateral side to the vehicle body is installed in a vehicle that has a relatively low clearance, the vent hole 101 is highly likely to be blocked by a door trim 102, resulting in a failure in gas discharging since, the seat position of the vehicle is low and the window shoulder position thereof is relatively high, as shown in FIG. 7.

In order to discharge the gas without the vent hole being blocked by the door trim, there are following five options and the like for the vent hole location in the airbag: occupant side, upper end, inside of the seat, lower end, and front end. However, all of them have a problem.

(1) Vent Hole on the Occupant Side

It is difficult to discharge the gas away from the occupant.

(2) Vent Hole at the Upper End of the Airbag

When a curtain airbag is provided, the curtain air bag blocks the vent hole.

(3) Vent Hole Inside the Seat

A seat material may be subject to heat damage.

Furthermore, since the vent hole is located close to a gas inlet, the gas is promptly discharged and sufficient protection performance cannot be ensured.

(4) Vent Hole at the Lower End of the Airbag

The vent hole may be blocked by a seat cushion.

Furthermore, gas around the lower back of the occupant is promptly discharged and sufficient protection performance cannot be ensured.

(5) Vent Hole at the Front End of the Airbag

Since the vent hole is located close to an arm of the occupant, the possibility cannot be eliminated that the arm may block the vent hole and the gas hit the arm.

SUMMARY OF THE INVENTION

The present invention is made in view of the above, and an object thereof is to provide a side air bag apparatus that reliably prevents a vent hole from being blocked and gas from moving toward an occupant, discharge the gas from an appropriate position, and thereby ensures occupant protection performance.

In order to achieve the above object, upon a crash of a vehicle, a side airbag apparatus according to the present invention fills an air bag body with gas, inflates the airbag body, and deploys the airbag body between a side door and an occupant. Furthermore, in a side airbag apparatus according to the present invention wherein the charged gas is discharged from a vent hole provided at the air bag body, the vent hole is directed to the front side of the vehicle when the air bag body is inflated, the vent hole is composed of a plurality of vent holes disposed a plurality of vertical positions including a position corresponding to a shoulder position of the occupant, and each vent hole is blocked by a blocking member that can be opened when a deployment amount by which the airbag body is deployed due to inflation exceeds a predetermined amount.

According to the present invention, when an airbag is inflated, gas can be discharged from an appropriate position, a vent hole can be avoided from being blocked, gas can be avoided from moving to an occupant, and thereby occupant protection performance can be ensured.

DESCRIPTION OF THE PREFERRED EMBODIMENTS

An embodiment of the present invention will hereunder be described with reference to the drawings.

Figure 3:
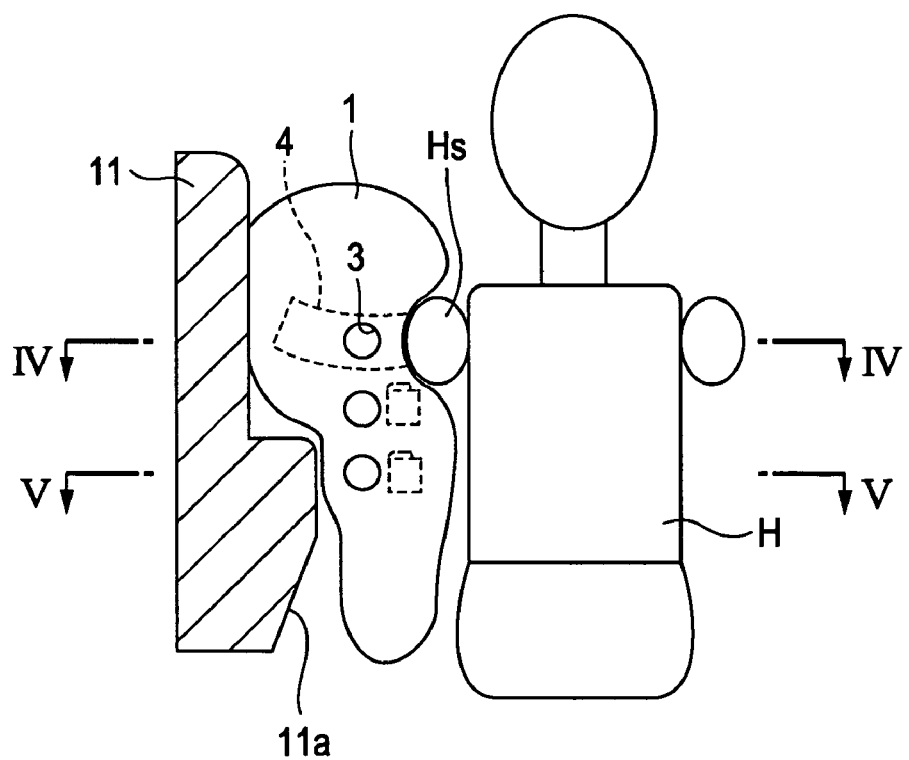
FIG. 3 is an illustrative view showing the relationship among a door trim, an airbag body and an occupant.

As shown in FIGS. 1 and 3, a side airbag apparatus according to the present invention includes an air bag body 1 that is stored in a folded state on a side-door-11 side in a seat back of a vehicle, a cylindrical inflator (not shown) that is connected to the air bag body and integrally stored. Upon a collision of the vehicle, the air bag body 1 is inflated by gas generated in the inflator, is deployed between a door trim 11a and an occupant H, and absorbs impact, and thereby the occupant is protected from a secondary collision.

A plurality of vent holes 3 are disposed vertically at a predetermined interval in a region of the airbag body 1 that is directed to the front of the vehicle upon inflation (front side shown in FIGS. 1A and 3) so as to discharge the gas filled in the airbag body forward. The number of pores in the vent holes 3 and a diameter thereof are properly set according to the volume of the airbag body 1 and the pressure of the charged gas or the like.

Figure 1A:
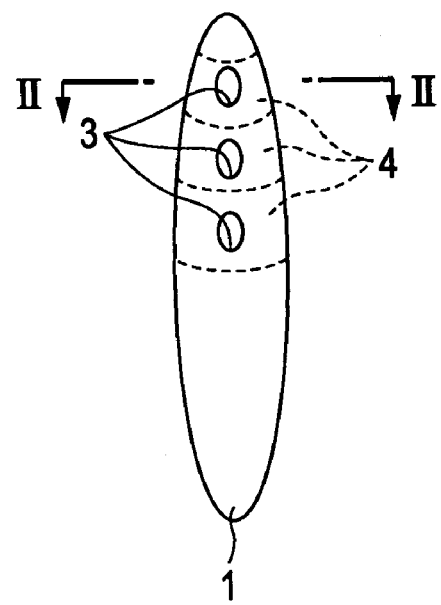
FIG. 1 is an illustrative view of a vent hole of a side air bag according to the present invention.
Figure 1B:
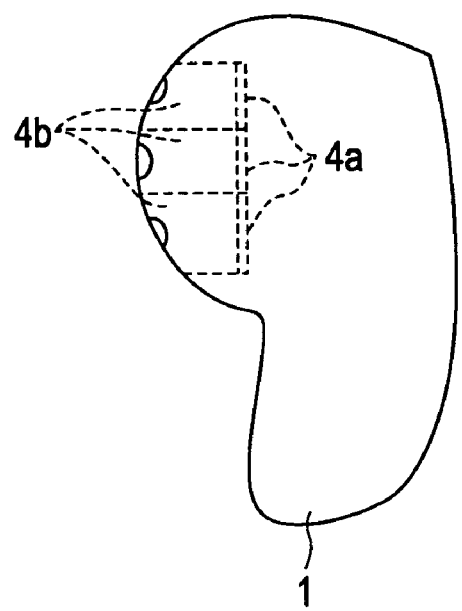

Before the inflator is activated to inflate the airbag body 1, each vent hole 3 is blocked by a blocking member 4 that is attached to an inner surface of the airbag body 1, as shown in FIGS. 1A and 1B. In the present embodiment, the blocking member 4 has a sheet-like, elongate member which is, for example, formed with a same cloth member as the air bag body 1 and disposed substantially perpendicularly to the disposition direction of the vent holes. An occupant-side end portion of the blocking member 4, denoted by 4a, is strongly fixed to the airbag body 1 by sewing or the like, as shown in FIG. 1B. Other portions of the blocking member 4 are a temporary joint portion 4b that is openably and closably attached to the inner surface of the airbag body 1 by sewing, adhesion or the like with a relatively small attachment force. The vent holes 3 are blocked by these temporary joint portions 4b.

Figure 2:
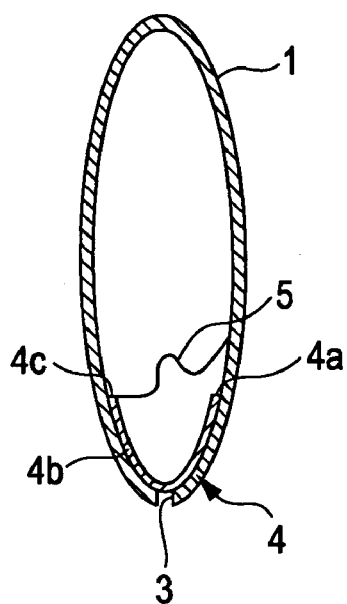
FIG. 2 is sectional view taken along line II-II in FIG. 1.

Furthermore, as shown in FIG. 2, an end portion of the temporary joint portion 4b, denoted by 4c, is fixed to an end of an elongate connecting member 5. The other end of the connecting member 5 is fixed to an opposite inner surface of the airbag body 1. The connecting member 5 is interposed between the blocking member 4 and the airbag body 1 with appropriate slack when the airbag is not inflated.

In order to show the disposition of the blocking member 4, FIGS. 1A and 1B show the airbag body 1 in a state that it is slightly inflated. FIG. 1A shows a surface at a vehicle-front side, whereas FIG. 1B shows a surface at an occupant (driver) side. At a passenger side, the mounting relationship of the blocking member 4 and the connecting member 5 is opposite to the relationship for FIG. 1.

The length of the connecting member 5 is set such that, when the airbag body 1 is inflated and deployed beyond a predetermined deployment amount, the connecting member 5 pulls the temporary joint portions 4b of the blocking member 4, peels off the temporary joint portions 4b from the inner surface of the airbag body 1, and thereby open the vent holes 3. Because of this, the connecting member is formed with an elongate member that has a prescribed strength and thermal resistance, such as cord, wire, and tape.

As described above, the air bag body 1 is provided with a plurality of the vent holes 3 which are disposed vertically. The vertical positions of the vent holes 3 are set such that at least one or more of the vent holes reaches the position of a shoulder portion (including an arm portion) of the occupant when the air bag body 1 is inflated and deployed. When the airbag is inflated, the vent hole whose vertical position is set same as the position of the occupant's shoulder portion does not open, and only the vent holes 3 located at other positions open.

Figure 4:
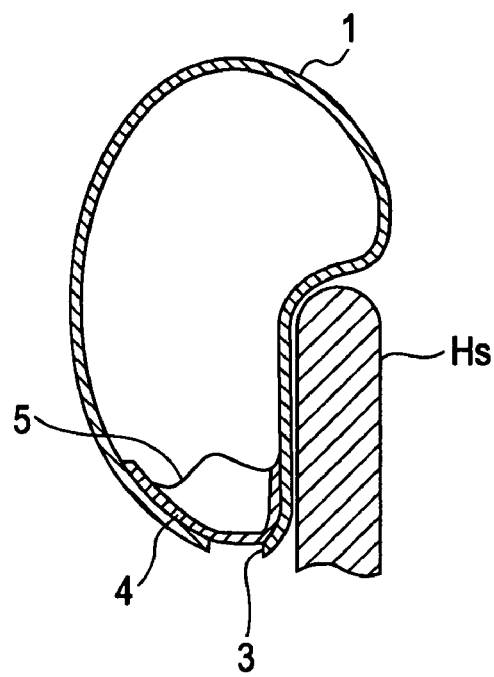
FIG. 4 is sectional view taken along line IV-IV in FIG. 3.

An action of the airbag body 1 upon inflation will be explained with reference to FIGS. 3 to 5. FIG. 3 shows a state in which the airbag body 1 is inflated and deployed, and the uppermost vent hole 3 abuts a shoulder portion of the occupant Hs. In this state, as shown in FIG. 4, which is a section taken along line IV-IV in FIG. 3, the deployment of a portion where an end of the connecting member 5 is fixed in the airbag body 1 is restrained by the shoulder portion (including the arm portion) of the occupant and the connecting member 5 remains loose. Therefore, the blocking member 4 keeps blocking the vent hole 3 and prevent the gas from releasing, and thus the high-temperature gas does not move toward the occupant.

Figure 5:
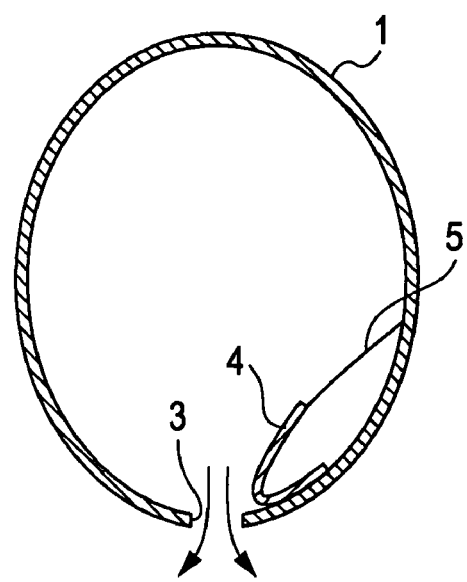
FIG. 5 is sectional view taken along line V-V in FIG. 3.
Figure 6:
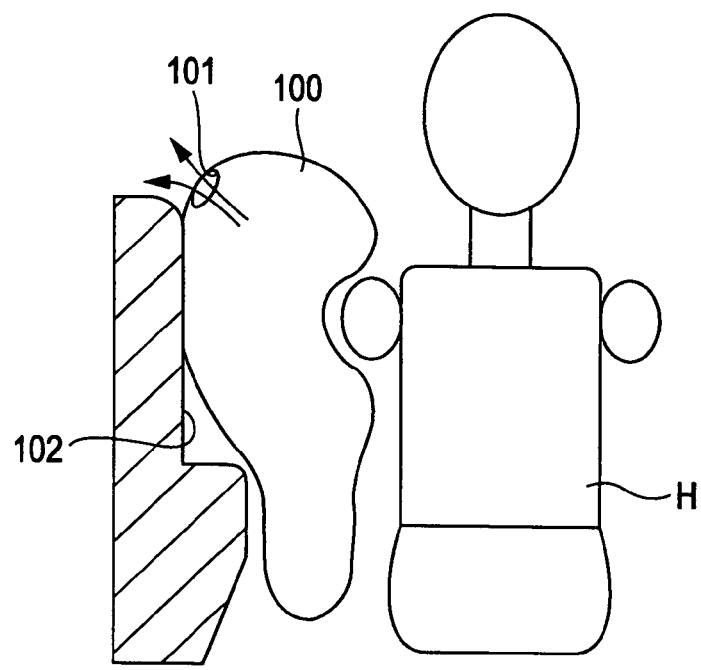
FIG. 6 is an illustrative view of a vent hole of a conventional side air bag.
Figure 7:
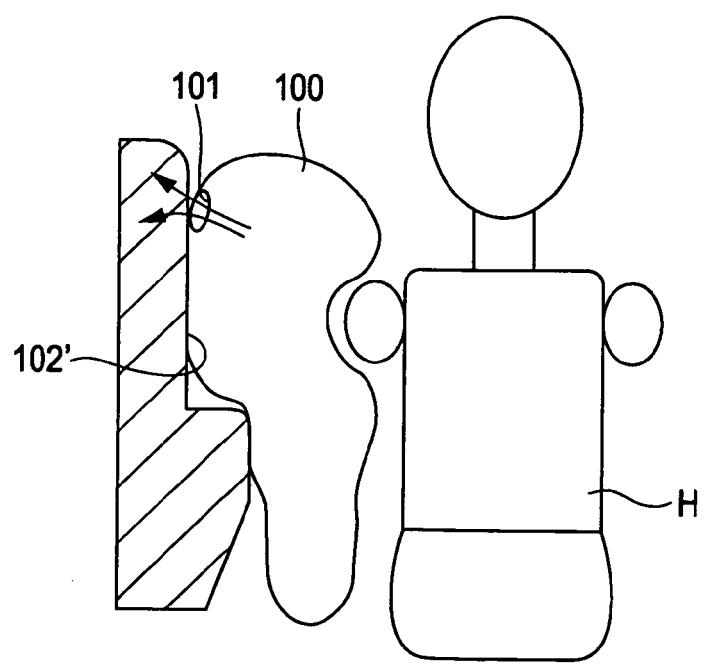
FIG. 7 is an illustrative view for a case the conventional airbag is applied to a low-clearance vehicle.

On the other hand, at other positions in the airbag body 1 other than the position corresponding to the shoulder portion of the occupant, the airbag body 1 is inflated beyond a deployment amount at the position corresponding to the shoulder portion of the occupant, as shown in FIG. 5, which is a section taken along line V-V in FIG. 3. As a result, the temporary joint portions 4b of the blocking member 4 is pulled by the intermediary of the connecting member 5 and peeled off from the inner surface of the airbag body 1 so as to open the vent holes 3. Accordingly, the gas filled in the airbag body 1 is discharged forward.

As described above, in the present embodiment, when the airbag body 1 is inflated and deployed between the door trim 11a and the occupant H upon a collision of the vehicle, the gas can be discharged automatically toward the position where the arm portion of the occupant is not present. Accordingly, the high-temperature gas does not blow against the arm portion of the occupant, and thereby safety is ensured.

Furthermore, since the gas is discharged from the front end side of the airbag body 1, the vent holes are not blocked by a curtain airbag, door trim, seat cushion or the like. Therefore, heat damage to a vehicle interior member, gas discharge at the occupant's lower back and early discharge are avoided, and thereby stable occupant protection safety is achieved.

What is claimed is:

1. A side airbag apparatus, comprising an airbag body that is filled with a gas and deployed between a side door and an occupant upon a crash of a vehicle upon a vehicle collision, the gas being discharged from a vent hole provided in the airbag body, wherein the vent hole is directed to a front side of the vehicle, wherein the vent hole is blocked by a blocking member that can be opened when a deployment amount by which the airbag body is deployed due to inflation exceeds a predetermined amount, wherein an end of the blocking member is fixed to an inner surface of the airbag body and an other end portion of the blocking member is openably and closably attached to an other inner surface of the airbag body, wherein the other end portion of the blocking member is connected to an opposite inner surface of the airbag body by an intermediary of a connecting member, and wherein, when the airbag body is inflated beyond a deployment amount at a position corresponding to a shoulder portion of the occupant, the blocking member is pulled by the intermediary of the connecting member and peeled off from the inner surface of the airbag so as to open the vent holes.

2. The side airbag apparatus according to claim 1, further comprising a plurality of vent holes disposed vertically, relative to a shoulder position of the occupant.

3. An airbag apparatus, comprising:
an airbag body having a plurality of vent-holes vertically arranged and along a front side of the airbag body;
a blocking member provided inside the airbag body to block at least one vent-hole of the plurality of vent-holes; and
an elongated connecting member being fixed to the blocking member, said connecting member being configured to be slack when the airbag is not inflated and to be in tension when the airbag is inflated beyond a predetermined deployment amount.

4. The airbag apparatus according to claim 3, wherein said airbag body comprises a sheet-like elongated member.

5. The airbag apparatus according to claim 3, wherein said blocking member is associated to an inner surface of the airbag body via a fixed portion and a temporary joint portion selectively attachable to the inner surface of the airbag body.

6. The airbag apparatus according to claim 5, wherein said elongated connecting member is attached to a portion of the inner surface of the airbag body opposed to the temporary joint portion.

7. The airbag apparatus according to claim 3, wherein said predetermined deployment amount comprises an amount of inflation greater than an amount of inflation of a portion of the airbag being constrained by an occupant.

8. The airbag apparatus according to claim 3, wherein said predetermined deployment amount comprises an amount of inflation equivalent to an amount of inflation of a portion of the airbag being unconstrained by an occupant.

9. The airbag apparatus according to claim 3, wherein, when said elongated connecting member is in tension, said blocking member is moved to unblock the at least one vent-hole.

10. The airbag apparatus according to claim 3, wherein the blocking member comprises a plurality of blocking members and the elongated connecting member comprises a plurality of elongated connecting members, each one of the plurality of blocking members and the elongated connecting members being respectively associated with a respective one of the plurality of vent-holes.

11. The airbag apparatus according to claim 3, wherein said blocking member is arranged substantially perpendicular to one of the plurality of the vent-holes.

12. An airbag apparatus, comprising:
an airbag body having a polurality of vent-holes disposed vertically, relative to a shoulder of an occupant;
a blocking member associated with at least one vent-hole of the plurality of vent-holes; and
a connection member associated with the blocking member, said connection member connecting the blocking member with an interior surface of the airbag to pull the blocking member open when an amount of inflation of the airbag is greater than a predetermined inflation amount,
wherein an other end portion of the blocking member is openably and closably attached to an other inner surface of the airbag body.

13. The airbag apparatus according to claim 12, wherein the predetermined inflation amount comprises an amount approximating an amount of a fully inflated airbag.

14. The airbag apparatus according to claim 12, wherein the predetermined inflation amount comprises an amount approximating an amount of an airbag inflated to an amount that is other than at a vertical position of the occupant's shoulder.

15. The airbag apparatus according to claim 12, wherein the vent hole is directed to a front side of the vehicle.

16. The airbag apparatus according to claim 12, wherein the connection member comprises one of a cord, a wire, and an adhesive.

* * * * *